Patented Mar. 16, 1937

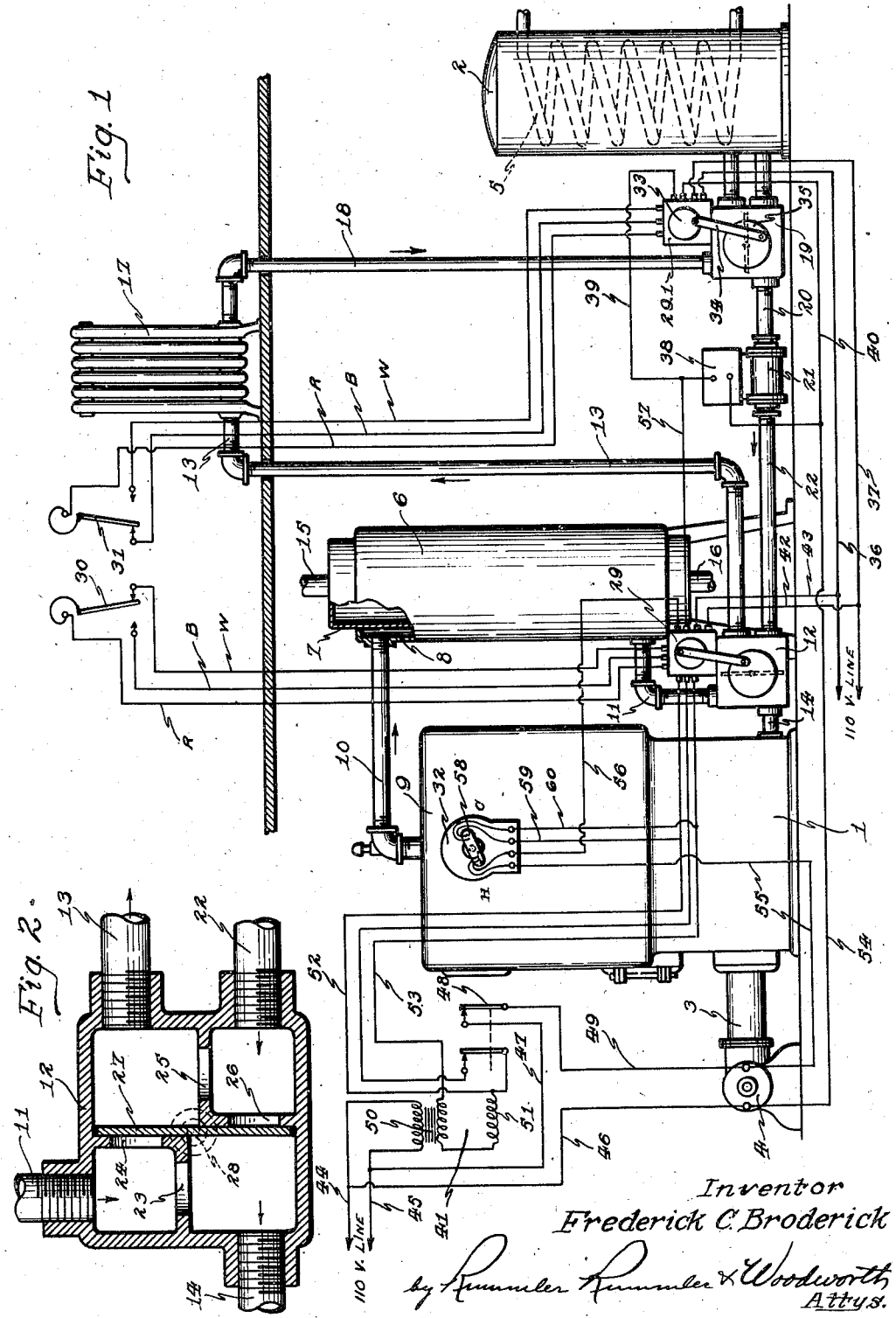

2,073,677

UNITED STATES PATENT OFFICE 2,073,677

TEMPERATURE REGULATING SYSTEM

Frederick C. Broderick, Winnetka, Ill.

Application March 16, 1935, Serial No. 11,436

4 Claims. (Cl. 257—3)

This invention relates to combined heating and cooling systems adapted for the requirements of dwellings, conservatories or work shops where regulation of the temperature of the atmosphere is desired to meet year around seasonable changes; and where it is also desired to utilize the heating system to provide a constant year around supply of hot water for other uses.

The main objects of the invention are to bring about an improved coordination in the operation of a heating system and an associated cooling system, for air temperature control, in connection with a water heater which requires heat from the heating plant whether or not this plant is also operating to deliver heat to the atmosphere of the building; and to provide an improved combination of heating and cooling apparatus utilizing a common heat interchanger for both heating and cooling operations.

These objects can be accomplished by means of a construction as illustrated in the drawing in which:

Figure 1 is a diagrammatic illustration of the general plan of the system.

Fig. 2 is a sectional view of a control valve, two of which are required in the system as illustrated by Figure 1.

The principal elements employed in this temperature regulation means are, interchangers for delivering heat to or extracting heat from the surrounding atmosphere, a heating plant and a cooling plant for respectively delivering hot and cold mediums to the interchangers, and a water heater including a hot water storage tank which receives heat from the heating plant even though the latter is not operating to deliver heat to the interchangers.

These various elements are operated and controlled by electric motors which in turn are under the control of a plurality of thermostats, the motors operating the heating and cooling plants and also the valves in the system. A single motor driven pump is used for circulating either heating or cooling mediums through the interchangers and the electrical circuit for the pump motor is connected with both the heating and cooling plant controlling circuits, and the motors for operating the valves so that operation of the pump will be dependent on and secondary to whichever plant is in operation, the two plants being independently controlled by respective thermostats which function according to atmospheric temperature changes to cause either a heating or a cooling medium to be supplied to the interchangers depending upon which influence is required to maintain the predetermined desired atmospheric temperature conditions.

Referring to the drawing, a hot water heating plant 1 and a cooling plant 2 are diagrammatically shown. An oil burner 3 for the heating plant is shown connected with an operating motor 4. The cooling plant consists of a storage receptacle for the medium which is circulated through the radiators and in this receptacle is a brine coil 5 or other conductor for a refrigerating medium.

A water heater is indicated at 6 and comprises an inner storage receptacle 7 for hot water and an outer jacket 8 which receives water from boiler 9 of the heating plant through conduit 10. An outlet 11 from the heating jacket leads to a valve 12 which directs the hot water either to a supply conduit 13 for the radiators or directly to the boiler through a return conduit 14.

The outlet 15 of the hot water storage tank or reservoir 7 is shown broken away and pipe 16, likewise broken away, indicates the cold water inlet of the storage receptacle.

A heat interchanger 17, shown in the form of an ordinary radiator, is connected to conduit 13 and to a return conduit 18. This return conduit leads to a valve 19, similar to valve 12, which in one setting permits the conduit 18 to communicate directly through the valve with conduit 20 which, through a circulating pump 21, communicates with a return conduit 22, leading to valve 12.

Figure 2 serves to illustrate the construction of both valves 12 and 19. The valve body as shown is divided into four sections by partition walls containing the ports 23, 24, 25 and 26 and the opening and closing of the ports are effected by valve means or a valve wing, 27 mounted on a pivot at 28.

A motor 29 (see Fig. 1), serves to set the valve means or wing either in the vertical position, as indicated in Figure 2, where it closes the ports 24 and 26, or in a horizontal position where it closes the ports 23 and 25.

As shown each of the valves, 12 and 19, is provided with its own operating motor, indicated at 29 and 29.1 respectively and these motors are so controlled, as will be hereafter described, that the valve elements of the valves 12 and 19 will not at any time both be, properly, in the horizontal position. That is, either one will be vertical and the other horizontal so that the heating plant 1 or the cooling plant 2, as the case may be, will be in communication with the interchanger 17, or both valve elements will be in a vertical position wherein both the heating and cooling plants are cut off from the interchanger.

It will now be seen that through the valves 12 and 19, and the associated piping, the boiler 9, heater 6 and interchanger 17 are connected in series; and likewise the cooling plant 2 and the interchanger are connected in series through the same valves, the circuit depending upon the relative setting of the respective valve elements. However, when the valve 12 is in a vertical position, as shown, closing off the interchanger from the boiler, the boiler water is still free to circulate gravitationally through the water heater jacket 8 by way of the conduits 10, 11 and 14, passing through the valve 12 by way of port 23 thereof.

Thus, regardless of whether or not the heating plant is supplying heat to the interchanger, or whether the cooling plant is supplying cooling medium thereto, the boiler water, which is automatically maintained the year around at a constant temperature as will be explained, will constantly circulate through the heater 6 to maintain the domestic hot water supply.

In winter operation, and when heat is required at the interchanger 17, the valve element of the valve 19 will normally be in a vertical position closing off the ports 24 and 26 and permitting communication between the conduits 18 and 20 directly through the port 23. Thus when the room heating thermostat 30 calls for heat, the valve element of the valve 12 will be shifted to a horizontal position closing the ports 23 and 25 and permitting communication between the conduits 11 and 13 and 22 and 14 respectively by way of ports 24 and 26. The circulation of heating medium will then be from the boiler 9 to the heater 6 by way of conduit 10, then by way of conduit 11 to the valve 12 and through the port 24 thereof to the interchanger supply conduit 13. From the interchanger 17 the return heating medium passes through the conduit 18, through the valve 19 by way of port 23 thereof to the connection 20 and thence to the pump 21 and the conduit 22 to the valve 12 where it passes through the port 26 to the boiler return connection 14.

When the heating thermostat 30 is satisfied the valve element of the valve 12 is shifted to a vertical position and the pump is stopped, the circulation of heating medium being then gravitational through the heater 6 exclusively, as heretofore explained.

In summer operation the thermostat 30 will normally be in its "hot" or satisfied position, as shown in the drawing and the cooling plant 2 will function off and on in response to the cooling thermostat 31 according to whether or not cooling medium is required in the interchanger 17. When cooling is required the thermostat 31 will swing to the position shown and the valve element of the valve 19 will assume the position shown closing the ports 23 and 25 thereof, the element of the valve 12 being normally in the vertical position shown, closing the ports 24 and 26 thereof, during the entire warm or summer season.

Under such conditions, the pump operating in response to opening of the valve 19, the cooling medium will circulate from the cooling plant 2 through the port 26 in the lower portion of the valve 19, through the connection 20 and the pump 21 to the valve 12 by way of connection 22, through the port 25 of the valve 12 to the supply conduit 13, and thence through the interchanger 17 and return conduit 18 back to the valve 19 through which it passes, by way of port 24, back to the cooling plant 2.

Meanwhile the boiler 9 will be kept at a constant temperature by the burner 3 operating in response to the boiler thermostat 32 and boiler water will constantly circulate gravitationally through the water heater 6 and the port 23 of the valve 12 as has been explained. Thus the cooling plant and its operating circuit and the domestic water heating system will operate independently and simultaneously.

The motors 29 and 29.1 may be of any suitable kind arranged to open and close a valve in response to a remotely located thermostat and to simultaneously operate suitable switching means. The motors 29 and 29.1 indicated are intended to represent low voltage valve operating motors such as are manufactured by the Minneapolis-Honeywell Regulator Co. and at present standard equipment with them for combined valve operating and switching purposes. These motors are described in the Minneapolis-Honeywell Regulator Company's Bulletin M6, dated Feb. 1, 1933, and entitled "Type D Motors". Also the several electrical connections shown in the drawing are arranged in accordance with the present practices of that manufacturer.

These motors, as indicated, drive a crank wheel 33 which is connected by a link 34 to a crank wheel 35 mounted on the shaft or pivot 28 of the valve element. The motors are each arranged to rotate the crank wheel 33 one-half revolution or 180° for each operating impulse from the respective thermostat, and the link 34 together with the crank wheel 35 are arranged so that for each half revolution of the wheel 33 the wheel 35 will be turned one quarter revolution or 45°. The motors 29 and 29.1 drive the respective wheels 33 in one direction only, but because of the linkage arrangement the wheel 35 moves first in one direction for 45° and then back to its initial position, moving entirely in one quadrant.

As shown, the motors 29 and 29.1 are independently controlled by their respective thermostats 30 and 31, which are shown as separate devices. It will be understood however that these thermostats may be combined or built into a single unit which will function to independently control both the heating and cooling plants. In each case the operation of the valve motors and the electrical connections between the motors and their respective thermostats are identical, each thermostat having three leads connected with suitable terminals on the respective motors and identified as R, B and W respectively.

The lead R is the "hot" or live lead, and the leads B and W are the controlling leads. As shown current is supplied to each valve motor from a 110 volt line, indicated by the numerals 36 and 37, and the motors are connected in parallel. A choke coil built into the motors, but not shown, reduces the line current to a low voltage suitable for control purposes and such low voltage current passes to the respective thermostats 30 and 31 through the lead marked R. When the shiftable element of either thermostat contacts a terminal to which a B lead is connected the low voltage current will then flow through that lead to the motor and cause the same to rotate, shifting the crank wheel 33 180° and opening the respective valve. A suitable switching arrangement, not shown, built into the motor causes it to stop when the valve is open. Then when the element of the thermostat shifts to the contact to which the W lead is connected the current will flow through that lead and cause the motor to rotate until the respective valve is closed, the motor automatically stopping at that point. Thus it is seen that current is supplied by the R lead and that the B lead, when energized, opens the respective valve and the W lead, when energized closes the valve.

It will be noted that as shown the thermostats 30 and 31 are arranged to move in opposite directions upon a rise or fall of temperature. Thus when the temperature falls the thermostat 30 will energize the respective B lead and the thermostat 31 will energize the respective W lead. Conversely when the temperature rises the thermostat 30 will energize the respective W lead and the thermostat 31 will energize the respective B lead. This will be further explained in the statement of operation of the controls.

Each motor has also built into it a second switch which controls the motor 39 of the pump or circulator 21. This switch is not shown but is automatically closed when the motor rotates to open its respective valve and is opened when the motor rotates to close the respective valve.

In operating the hereindescribed heating and cooling system the thermostats 30 and 31 are arranged to operate between different temperature ranges. The heating thermostat 30 is preferably arranged to function at a temperature of 72° F. and below and the cooling thermostat 32 at a temperature of 78° F. and above. Thus if there is a 4° lag between the "off" and "on" positions of the thermostats the heating thermostat 30 will cause the heating plant 1 to be cut off from the interchanger 17 at 72° F. and to supply heat to the interchanger at 68° F. or below; and the cooling thermostat 31 will cause the cooling plant 2 to be cut off from the interchanger 17 at 78° F. and to supply cooling medium to the interchanger at 82° F. and above.

Thus in summer operation the element of the thermostat 30 will normally be engaging the contact of the W lead which when energized causes the valve motor 29 to close the valve 12 against any circulation of boiler water to the interchanger, and this valve will stay with its valve element in the vertical position as shown in the drawing. Now should the atmospheric temperature in the space to be controlled reach 82° F. the element of the cooling thermostat 31 will engage the contact of the respective B lead, energizing the same, and cause the motor 29.1 to open the valve 19, that is shift the valve element to a horizontal position. Under this setting of the valve 19 the enclosed switch controlling the circulator motor 38 will be closed and the circulator started, receiving its energy from the 110 volt lines 36—37 by way of the motor switch and the leads 39 and 40 connecting the same with the motor 38.

Thus circulation of cooling medium will be had from the cooling plant 2 through the lower portion of the valve 19 and by way of the conduit 20, the circulator 21, the conduit 22 and the valve 12 to the supply pipe 13 and the interchanger 17. The return cooling medium passing through the conduit 18 and the upper portion of the valve 19 to the cooling plant 2 where it is cooled by the refrigerating coils 5 and recirculated back to the interchanger. Such circulation will be maintained until the atmospheric temperature around the thermostat has been cooled by the interchanger 17 to the cutting off temperature of 78° F. at which point the thermostatic element will engage the contact of the respective W lead causing the motor 29.1 to close the valve 19, which action will open the switch controlling the circulator motor 38 to stop the same.

In winter operation the element of the thermostat 31 will normally be engaging the contact of the W lead, so that the motor 29.1 will hold the valve 19 in the closed position with the valve element vertically closing off communication between the cooling plant 2 and the conduits 18 and 20. Upon a drop of temperature in the space under control in which the thermostats are located the element of the thermostat 30 will engage the contact of the respective B lead thus energizing that lead and causing the motor 29 to open the valve 12 by shifting the valve element to a horizontal position.

Thus circulation of heating medium will be had from the boiler 9 by way of the domestic water heater 6 through the upper portion of the valve 12 into the supply conduit 13, and thence to the interchanger 17, the return heating medium passing through the conduit 18, the valve 19, the lower portion of the valve, and back to the boiler through the return connection 14.

The motor 29 is similar to the motor 29.1 and like the motor 29.1 is provided with a motor switch for controlling the circulator motor 38.

However the motor 29 is also provided with a second switch which controls a relay 41 which in turn controls operation of the motor 4 of the oil burner 3.

This second switch in the valve motor 29 is arranged to close the relay 41 upon opening of the valve 12 and to open the relay 41 upon closing of the valve 12. Thus at any time that the valve 12 is opened so that communication is had between the boiler 9 and the interchanger 17 the oil burner 3 will function to deliver heat to the boiler 9.

The current for operating the valve motor 29 is supplied from the 110 volt lines 36 and 37 by way of the connections 42 and 43.

The relay 41 serves to close a circuit between the oil burner motor 4 and the 110 volt feed lines 44 and 45, the line 44 being connected directly to the motor 4 by way of lead 46 and the line 45 being connected to the motor 4 by way of leads 47, switch 48, and lead 49. As shown in the drawing, the relay 41 is operated by a low voltage current which is supplied by a choke coil 50 connected across the lines 44 and 45. Low voltage current from the choke coil 50 energizes an actuating coil 51 by passing through the connections 52 and 53 which are short circuited by the second switch built into the valve motor 29, so that when the valve motor operates to open the valve 12 the second switch closes the circuit between the lines 52 and 53 and causes the switch 48 to be closed, and thus close the circuit between the lines 44 and 45 and the oil burner motor 4.

As shown in the drawing the oil burner motor 4 and the circulator motor 38 are connected in parallel so that they may operate simultaneously upon operation of the thermostat 30 so as to open the valve 12. This arrangement is had by connecting the motor 38 to one side of the oil burner 4 by lead 54 and connecting the other side of the motor 38 to the other side of the oil burner motor by leads 55, 56 and 57 which interconnect serially the boiler thermostat 32 and the circulator motor switch included in the valve motor 29. As shown the boiler thermostat 32 is a double acting device having a two-way mercury tube 58 arranged so that when the boiler water is at a predetermined minimum temperature the tube 58 will be tilted toward the hot side indicated by the letter "H" so as to maintain a connection between lines 55 and 56. Thus when the boiler water is at or above the predetermined minimum temperature, and when the motor 29 is operated by the thermostat 30 so as to open the valve 12, a circuit will be completed by way of leads 55 and 56 through the mercury tube 58 of the boiler thermostat 32 and by way of the circulator switch in the valve motor 29 and the lead 57 to the motor 38, and thence by way of lead 54 to the opposite side of the oil burner motor 4, so that the motors 4 and 38 will be in parallel, and will be simultaneously energized by the lines 44 and 45 through closing of the switch 48 of the relay, which in turn is actuated by the second switch included in the valve motor 29 when the said motor has operated to open the valve 12.

Circulation of boiler water to the interchanger 17 will be had, so long as the element of the thermostat 30 is in position to energize the respective B lead.

However, when the temperature in the space being heated by the interchanger 17 has reached the predetermined maximum temperature of 72° the element of the thermostat 30 will engage the contact of the respective W lead and cause the motor 29 to operate to close the valve 12, at which time the said motor will automatically open both of the switches incorporated with it which control the circulator motor 38 and the relay 41, thus breaking the circuit between the lines 52 and 53 so as to cause the switch 48 to drop open and break the circuit between the oil burner motor 4 and the feed lines 44 and 45.

The purpose of the double acting boiler thermostat 32 is to maintain the temperature of the boiler water at a predetermined minimum point and to prevent operation of the circulator motor 38 should the boiler water temperature drop below the predetermined minimum, thus obviating any possibility of circulating cool or cold boiler water through the interchanger 17. Should the boiler water drop below the predetermined minimum point, the mercury tube 58 will be tipped by means not shown to the cold or C side, causing a connection to be made between the leads 59 and 60 which are respectively connected with the leads 52 and 53 of the relay 41, thus short-circuiting the said lines 52 and 53 and causing the relay to operate so as to close the switch 48 and energize the oil burner motor 4, so that heat may be delivered to the boiler 9 to raise the temperature of the boiler water therein. Under such operation when the oil burner is being operated by the boiler thermostat 32 the connection between the lines 55 and 56 is broken, so that regardless of whether or not the room heating thermostat 30 should call for heat before the boiler water temperature has been raised above the predetermined minimum point, the circulator motor 38 will not operate.

The purpose of the circulator motor switch in the valve motor 29 is to prevent operation of the oil burner motor 4 when the circulator motor 38 is being energized through the motor switch in the valve motor 29.1, the valve motors 29 and 29.1 never being both in the valve opening position at the same time, because of the different ranges of operating temperatures to which the controlling thermostats 30 and 31 are subjected. Thus, whenever the motor switch in the valve motor 29.1 is closed to energize the motor 38, the motor switch in the valve motor 29 will be open.

In summer operation, when the valve 12 is normally maintained in its closed position, the boiler water in the heating plant 1 is maintained at the predetermined minimum temperature solely by means of the boiler thermostat 32, which on cooling of the boiler water tilts the mercury tube 58 to the cold side, so as to short circuit the relay leads 52 and 53 by means of the connections 59 and 60, and cause the oil burner motor 4 to operate, the oil burner motor 4 being stopped when the boiler water has been heated sufficiently by tilting of the mercury tube 58 to the hot side, thus opening the circuit between the lines 59 and 60 and opening the relay. In this way the boiler water is maintained at a constant temperature the year around, and because of thermogravitational circulation of the boiler water through the outer casing 8 of the heater 9 and the left-hand side of the valve 12 a constant supply of hot water for domestic use or for other purposes is maintained.

The main advantages of this invention lie in the arrangement of valves and piping connections wherein a single interchanger may be utilized for both heating and cooling purposes, and be under complete automatic control so as to function either as a heating or a cooling unit directly in accordance with the demands of the heating or cooling thermostats. While such an arrangement is not shown the herein described system is particularly adaptable to cases where concealed fin type interchanger units are employed in conjunction with fans or blowers for promoting the circulation of air over the interchanger unit and throughout the space the atmospheric temperature of which is to be controlled.

Another advantage lies in the fact that by means of the herein described invention a constant, year-around supply of hot water for domestic use is maintained, regardless of whether or not the system is functioning to heat or cool the atmosphere of the space affected by the interchanger 17.

Another advantage is had in the control arrangement wherein the entire system is fully automatic and wherein operation of the heating or cooling portions of the system in interference with each other is obviated. A further advantage in this system is had in the arrangement of electric connections for the circulator motor wherein during winter-time operation it is impossible for the circulator to function when the boiler water is below a predetermined minimum temperature, thus preventing circulation of cold boiler water to the interchanger when heat is normally required therein.

This last feature is particularly advantageous in extreme cold weather operation when upon starting of the heating plant 1 after a prolonged period during which the water in the interchanger circuit has become quite cold and there is a likelihood of the boiler water being circulated and then recirculated before the oil burner has had sufficient time to inject enough heat into the heating plant to bring the entire body of water up to the proper heating temperature.

Certain features of the control arrangement herein shown and described have been disclosed and claimed in my copending application Serial No. 11,435, filed March 16, 1935.

Although but one specific embodiment of this invention is herein shown and described, it will be understood that certain details of the arrangement shown may be altered or omitted without departing from the spirit of this invention as defined by the following claims:

I claim:

1. In an air temperature regulating system the combination with a boiler, a heat interchanger having supply and return connections with said boiler, a circulating pump in one of said interchanger connections, and a water heater connected with said boiler to constantly receive heat therefrom, of a cooling plant having series connection with said interchanger and said circulating pump, and shiftable valve means arranged to normally prevent circulation between both said boiler and said interchanger and said cooling plant and said interchanger, said valve means being shiftable to permit circulation between said interchanger and one or the other of said boiler and cooling plant.

2. A combined heating and cooling system comprising a boiler, a heat storage reservoir, a heat interchanger, suitable supply and return connections for said reservoir and said interchanger, and a circulating pump, all connected in series, a cooling plant having supply and return connections with said interchanger in series with said circulating pump, and valve means arranged to normally prevent circulation between said interchanger and both said boiler and cooling plant and permit circulation between said heat storage reservoir and said boiler exclusively, said valve means being arranged to be operable to permit circulation between said interchanger and one or the other of said boiler and cooling plant.

3. A combined heating and cooling system comprising a boiler, a heat storage reservoir, a heat interchanger, suitable supply and return connections for said reservoir and said interchanger, and a circulating pump, all connected in series, a cooling plant having supply and return connections with said interchanger in series with said circulating pump, valve means arranged to normally prevent circulation between said interchanger and both said boiler and cooling plant and permit circulation between said heat storage reservoir and said boiler exclusively when said pump is stopped, and means to shift said valve means to permit circulation between said boiler and said interchanger exclusive of said cooling plant, said means being also arranged to shift said valve means to permit circulation between said cooling plant and said interchanger exclusive of said boiler and simultaneous independent circulation between said boiler and said heat storage reservoir.

4. An air temperature regulating system comprising a heating plant, a heat storage reservoir, a heat interchanger, a cooling plant, and a circulating pump, all connected in series in a closed circuit, means affording a passageway providing direct return communication between said heat storage reservoir and said heating plant and bypassing the remainder of said series circuit and affording other passageways arranged to bypass circulation around said heating plant and said cooling plant separately, and valve means arranged to selectively control said passageways and said series circuit to permit circulation between said interchanger and one of said plants exclusively while stopping circulation between said interchanger and the other of said plants and to permit continuous circulation from said heating plant to said heat storage reservoir and back to said heating plant.

FREDERICK C. BRODERICK.